(12) United States Patent
Plascencia Mora et al.

(10) Patent No.: US 8,551,374 B2
(45) Date of Patent: Oct. 8, 2013

(54) METHOD FOR PRODUCING CONTINUOUS EXPANDED POLYSTYRENE FOAM PARTS

(75) Inventors: Héctor Plascencia Mora, Guanajuato (MX); Luz Antonio Aguilera Cortés, Guanajuato (MX)

(73) Assignee: Universidad de Guanajuato, Guanajuato (MX)

( * ) Notice: Subject to any disclaimer, the term of this patent is extended or adjusted under 35 U.S.C. 154(b) by 782 days.

(21) Appl. No.: 12/439,661

(22) PCT Filed: Aug. 30, 2007

(86) PCT No.: PCT/MX2007/000103
§ 371 (c)(1),
(2), (4) Date: Jun. 18, 2010

(87) PCT Pub. No.: WO2008/026908
PCT Pub. Date: Mar. 6, 2008

(65) Prior Publication Data
US 2010/0244299 A1    Sep. 30, 2010

(30) Foreign Application Priority Data
Aug. 30, 2006  (MX) .................... GT/a/2006/000017

(51) Int. Cl.
*B29C 44/04* (2006.01)
(52) U.S. Cl.
USPC .......... 264/45.1; 264/628; 264/241; 264/250; 264/254; 264/255; 264/413; 264/415; 264/45.4; 264/45.5; 264/45.6; 264/37.15

(58) Field of Classification Search
USPC ................. 264/45.1, 171.23, 171.28, 172.18, 264/173.14, 173.19, 415, 41, 45.4, 45.8, 264/46.5, 51, 55, 321, 628, 241, 250, 254, 264/255, 413, 45.5, 45.6, 37.15
See application file for complete search history.

(56) References Cited

U.S. PATENT DOCUMENTS 4,695,416 A * 9/1987 Treffner et al. ............... 264/45.4
2007/0066693 A1* 3/2007 Bres et al. ........................ 521/50

* cited by examiner

*Primary Examiner* — Jeffrey Wollschlager
*Assistant Examiner* — Stella Yi
(74) *Attorney, Agent, or Firm* — Panitch Schwarze Belisario & Nadel LLP

(57) ABSTRACT

The invention relates to a novel, innovative industrial method for producing polystyrene (EPS) foam parts of arbitrary length and having a constant cross-section, with mixed densities located in accordance with the mechanical and thermal properties required for each application. The invention also relates to a machine (apparatus) for producing said solid parts having localized densities defined by the mechanical and thermal requirements of the application. The aforementioned products are produced by joined both longitudinally and transversely. The invention can be used to reduce the standard method to three steps, thereby resulting in a significant saving in terms of production. Moreover, unlike with the standard method, variants can be produced using the above-mentioned method, thereby increasing the range of application said type of products.

11 Claims, 4 Drawing Sheets

METHOD FOR PRODUCING CONTINUOUS EXPANDED POLYSTYRENE FOAM PARTS

CROSS-REFERENCE TO RELATED APPLICATION

This application is a Section 371 of International Application No. PCT/MX2007/000103, filed Aug. 30, 2007, which was published on Mar. 6, 2008 under International Publication No. WO 2008/026908 A1, and the disclosure of which is incorporated herein by reference.

OBJECT OF THE INVENTION

This process has been continuously producing polystyrene foam parts (EPS), these are with a longitudinally constant cross-section geometry. The piece is got by joining partial pre-shaped segments, using an equipment with two cameras, one of pre-firing and other of final firing, this permits joining materials of same or different density also in long and cross direction, obtaining a new product with mechanical properties located in zones inside the piece as: thermal conductivity, flexion resistor, compression resistor, elasticity module, etc.

BACKGROUND OF THE INVENTION

In present technique for producing foam polystyrene elements of constant cross-section can be with an homogeneous density and a maximum length, determined this by the mould size in the discontinuous methods, or from a changeable length when they are produced in continuous form having a constant cross-section with same density along the whole piece.

There are three processes by which now can be made objects of constant cross section.

1.—The direct mould with press, in which there are three steps, pre-expansion of expansible polystyrene pearls, stabilization or intermediate rest of the pre-expanded pearls, final mould with the wished geometry. Using this process in a mould with the geometry of wished profile, in this point the process finishes, meanwhile, the length of product is limited by dimensions of the machine and by the maximum distance that can separate the moulds when you open the equipment, density of pieces is homogeneous in the whole piece.

2.—Cut from blocks, for which six steps are followed, pre-expansion of polystyrene pearls, stabilization or intermediate rest of pre-expanded pearls, final mould of blocks, stabilization of block, mechanized of the geometry, final disposition or remaining recycling. Using this process, it can be obtained bigger dimension pieces than using direct mould in press, but its length is limited by geometry of cutting equipment, as well, it is not possible to produce pieces mixing densities controlled by areas. An inconvenient of this process is that there are remains generated which have to be recycled.

3.—Continuous mould, that follows four steps, pre-expansion of polystyrene pearls, stabilization or intermediate rest of pre-expanded pearls, partial mould and final mould, with variant among them.

In particular, there are uses in building industries, although not limited to this industrial type that requires constant cross-section pieces in big quantities. In this kind of pieces, they are submitted to charges of flexion of different magnitude inside cross-section. Such a way that some portions of the cross-section are charged to its resistance limit, and other regions charge a small portion of its maximum limit, that is why the material is been sub using. The methodology of production that was developed takes four steps: pre-expansion, intermediate rest, partial mould and final mould, introducing materials of different densities in the partial mould or shape camera, it gives the possibility to join materials of different granulometries and densities in down and cross direction, although it could have arbitrary orientation. The advantage that represents the possibility to manage the location of densities is that they can control the mechanical properties as: conductivity, thermal, resistor to flexion, resistor to compression, module of electricity, etc. as it is required in every application so it reduces the needed quantity of material to produce a piece, and this derivates in a reduction of costs.

There are some patented equipments (U.S. Pat. No. 4,695,416, U.S. Pat. No. 4,539,167, U.S. Pat. No. 3,830,604, U.S. Pat. No. 3,674,387) that manufacture the continuous mould of EPS "blocks" in similar form of this invention, but our proposal has important differences and advantages in relation to the existing ones. They are about the use of a clamp to tie portions of finished material in the extreme side of the mould in order they be as a wall in the mould during the manufacturing and the final firing of the pre-firing segment, the use of two vaporization cameras, one of pre-firing and another of final foam firing, and the manage of different densities so as length or cross, although it could have and arbitrary orientation. The proposed equipment to manufacture this new kind of product which is different for having a constant cross-section of arbitrary length and mixes of densities along the element located by zones as it is illustrated in FIG. 1.

DETAILED DESCRIPTION OF THE INVENTION

We propose a new process to make foam pieces of polystyrene of arbitrary length and with mixed densities located by zones, this consists of next steps: Pre-expansion of expansible polystyrene pearl to one or several required densities (from 7.5 to 60 kg/m$^3$), intermediate rest independent for each material to each density, in containers with meshes that let that air goes to the interior (from three to ten hours depending on the density to atmosphere conditions), simultaneous feeding of each density with independent injectors in the wished region inside the camera of pre-firing to a higher pressure than atmospheric one which has one or several divisors that keep separated the regions according its density during the partial firing using water steam saturated with a pressure of 20 kPa during 15 seconds, the pre-fired element is introduced in a final fired camera, once taken the divisor it is tied by a clamp during the final fire using water steam saturated with a pressure of 100 kPa during 15 seconds. Simultaneously, the firing of the portion that is in the camera of final firing is repeated in the camera of pre-firing, the process has been described in the pre-firing stage, in such way that segments go consecutive joining to form a continuous piece.

The products that can be manufactured by this new process have characteristics that distinguish them from the ones produced with existing processes.

One of the main advantages is the possibility to manage the location of densities by zones, which permits to control the mechanical properties as: Thermal resistor (which is in a range between 0.51-0.84 m$^2$ K/W), resistor to flexion (which is in a range between 70 and 345 kPa), resistor to compression (which is between 35-173 kPa), elasticity module (which is between 1-3 MPa), etc., optimizing the use of material in each application and with this there is an important reduction of cost.

A machine to do this process is shown in FIG. 2-8 and is formed by twenty two main components: 1. Pusher with divisor of densities. 2. Injector of pearl, 3. Pre-firing camera, 4. Separator, 5. Firing camera, 6. Clamp, 7. Front door, 8.

Cooling off system, 9. Base with rollers, 10. Hopper for feeding pearl from EPS pre-expanded to different densities. 11. Valve for steam feeding of low pressure, 12. Valve for steam feeding of high pressure, 13. Firing camera closing system, 14. Front door closing system, 15. Valve for cooling off, 16. Steam nozzles, 17. Moulds back up, 18. Top mould for firing camera, 19. Bottom mould for firing camera, 20. Packs to seal among moulds, 21. Drains to atmosphere and 22: Lineal actuator.

The process for producing continuous mould is done by next procedure: First: pre-fire both steam cameras (3, 5) opening the valves (11, 12) during 30 seconds, they work in independent form to feed saturated steam water in the pre-fire camera to a pressure of 20 kPa and in the firing camera to 100 kPa; the valve that connects the mould camera to the cooling off system has to keep opened in order the steam goes to the atmosphere. Second: Close the firing camera (5) lock it with its closing system (13), close the front door (7) lock it with its closing system (14), it must be placed the pusher with the divisor of densities (1) in retracted position. Third: Inject the pearl of EPS pre-expanded to different densities kept in the hoppers (10) that in this case are two (but they can be more), at the same time in the pre-firing camera using commercial injectors. Fourth: close the cooling off valve (15), open the steam valve from the pre-firing camera (11) to reach a pressure of 20 kPa during 15 seconds and close the valve (11). Fifth: open the front door (7) and the firing camera (5). Sixth: Use pusher separator (1) to move the pre-fired segment to the firing camera (5), close the firing camera (5) and lock it with its closing systems (13) in order it presses the pre-fired material, turn back the separator pusher (1) to the retracted position. Seven: Inject material again to the pre-firing camera as in third step (11), feed steam in the firing camera to reach 100 kPa keeping during 5 seconds and at the same time in the pre-firing camera (11) to the conditions of fourth step. Eighth: Activate the cooling off system (8) and open the cooling off valve (15) during 45 seconds. Ninth: Open the firing camera (5), and repeat the process from sixth step in such a way that finished material goes over the base with rollers (9). Repeat this until getting the material with the wished length. A variant consists of taking away the separator of densities installed in the pusher (1), FIG. 9, which lets us to get segments of different densities alternating with a minimum long of the pre-firing length (3). Some advantages to produce a piece of EPS in a continuous form and with mixes of densities are: it can be produced an element of arbitrary length using a mould with less dimensions than the final piece. To mix densities let optimize the use of material so when density is controlled in the final piece by zones, it can be directly managed mechanical properties in this material because their strongly depend on seem density and so got elements can have improved properties according to its application. Besides, with the process of present invention, we reduce the steps in the traditional process to produce pieces of big size because using this innovating process, raw material is only pre-expanded, rests and is mould into the wished element, instead of mould a block first with more dimensions than the wished piece, let it there for 24 hours, mechanizing it by hot wires and recycle the block remaining.

FIG. 2 shows the top view and and side view of the machine used for producing elements of EPS in a continuous form with a mix of densities controlled by zones using the process object of this invention, displaying the following elements:
1. Pusher with divisor of densities.
2. Injectors of pearls.
3. Pre-firing camera.
5. Firing camera.
7. Front door.
8. Cooling off system.
9. Base with rollers.
10. Hoppers (chutes) for feeding pearl from EPS pre-expanded to different densities.
11. Valve for steam feeding in low pressure.
12. Valve for steam feeding in high pressure.
13. Firing camera closing system.
14. Front door closing system.
15. Valve for cooling off.

FIG. 3 shows a cross view of the pre-firing camera (3), which has following parts: 1. Pusher with divisor of densities, 2. Injectors of pearl, 3. Pre-firing camera, 11. Valve for steam feeding in low pressure, 16. Nozzles for steam, 17. Moulds back up. In this camera the injection of pearl is made from pre-expanded polystyrene in different densities for the injection at the same time by the injectors (2), the divisor (4) it avoid the mix of different materials. Backs up (17) support mould walls on the external steam camera to avoid flexion when internal pressure is provoked. Steam flows inside the camera through the nozzles (16) working the steam feeding valve of low pressure (11).

FIG. 4 shows a cross-section view of fire camera (5) and clamp (6), it consists in following parts: top mould firing camera (18), bottom mould firing camera (19), pack for sealing among moulds (20) and drains to the atmosphere (21). The firing camera (5) is separated in a vertical direction in two parts: The top mould firing camera (18) and the bottom mould firing camera (20), to let that the pre-fired segment in the pre firing camera (3) with a height (h) of 1.05 can get into this cavity because its height is less than the cavity 1.02 in the separator (4) and a height of the clamp (6), where "h" is the final height of molded product. Once the material is put for firing, the camera is closed and the steam is introduced by the high pressure feeding valve (12), and after the camera is cooled by the cooling off system (8). To avoid leakage of steam between moulds and air entrance during the cooling process the pack is used for sealing moulds (20).

FIG. 5 shows the geometric relations that the process uses by a longitudinal cut of the sections of the mould: Pre-firing camera (3) with a camera height of 1.05 h, where "h" is the final height of the finished product, this section has a length "L". Separator (4) with a height of closed camera equal to 1.02 times "h" and a length equal to 0.5 times "L". Firing camera (5) with a height of closed camera equal to "h" and a length equal to "L". Clamp (6), the clamp takes part of the firing camera, for entering to this section a pre-firing segment is compressed 0.2 times "h", applying a holding force that avoids the material be expelled by steam pressure once the front door is opened (7).

FIG. 6 shows a detail of close system (14) and the front door (7), which consists in some wedges that when the door is closed, they are extended using an establish lineal activator in top of the firing camera (5), they are inside two machine wedges wholes with some holders that are part of the front door (7), restricting the spin movement towards the front part, in such a way that hermetically seals the front part of firing mould during first firing of the material.

FIG. 7 shows a detail of the mechanical system which lets open and close the firing camera and clamp to permit pass of a pre-fired segment to the separator and the firing camera, having a minimum opening of 1.06 times "h", at the same time, the system protects the camera when it is closed, to avoid that steam pressure opens it.

FIG. 8 shows a longitudinal section view of the system composed by the lineal activator (22) and the pusher with the divisor of densities (1), such divisor may not be present and the produced pieces will have the distribution of densities shown in FIG. 9a, if it maintains only one divisor or if they are placed in divisors, we get pieces with the distribution of densities shown in FIGS. 9b and 9c respectively.

Some advantages to produce a piece of EPS in a continuous form and with mix of densities are: an element of arbitrary length can be produced using a smaller mould than the final piece. The mix of materials let to optimize the use of material, for controlling the density of final piece by zones, mechanical properties of this material are directly managed so they strongly depend on the seem density, according the innovative process we claim, the steps in the traditional process are reduced to produce pieces of big size, for using this process the raw material only pre-expands, rests, and the wished element is molded, instead of molding first a block with bigger dimensions than the wished piece, let it during 24 hours, mechanizing by cutting of hot wires and recycling the waste of the block.

Figure 1:
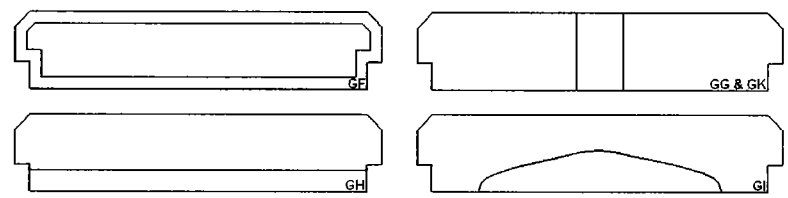
FIG. 1. Solid product with mix of densities.
Figure 2:
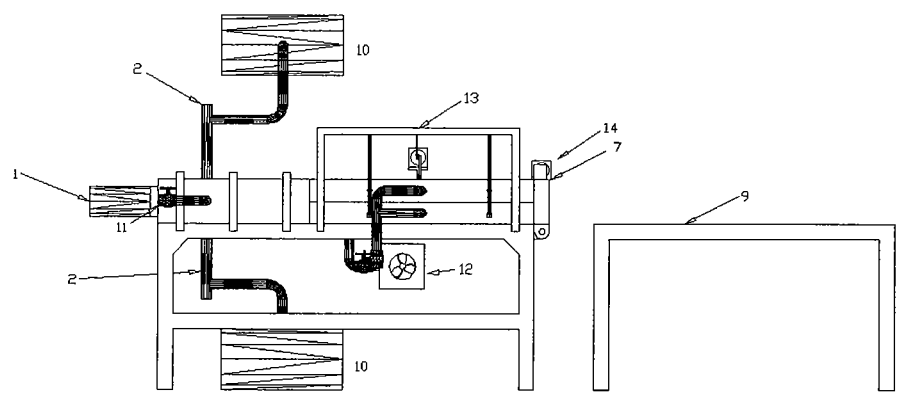
FIG. 2. Side and top view of production set.
Figure 2:
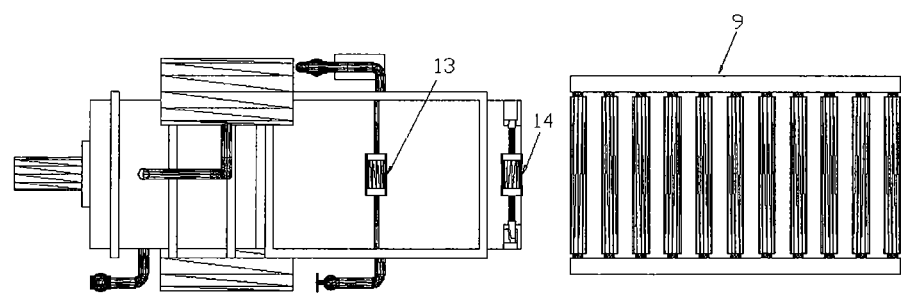
Figure 3:
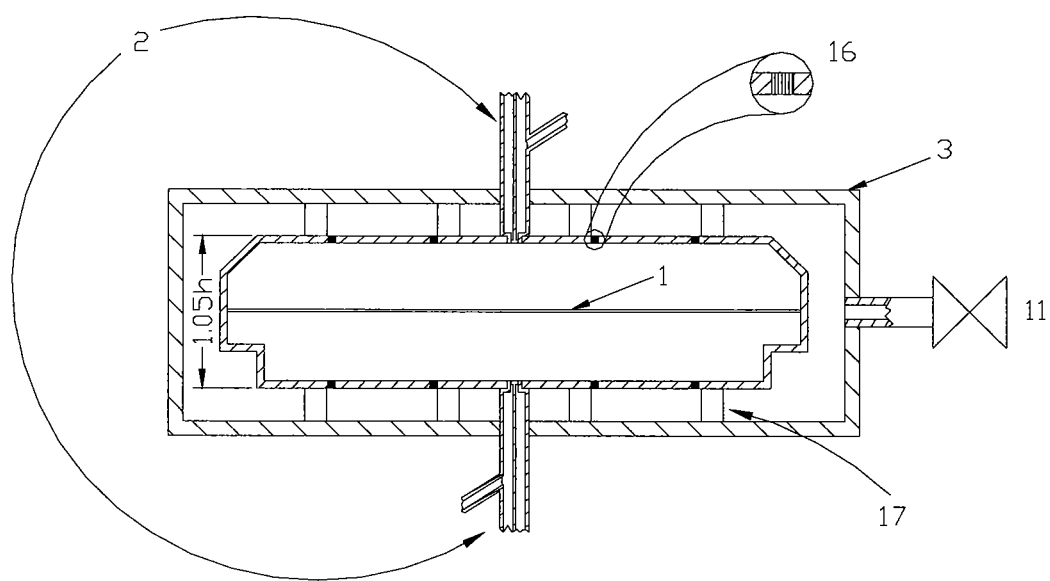
FIG. 3. Cross-section view of pre-firing camera.
Figure 4:
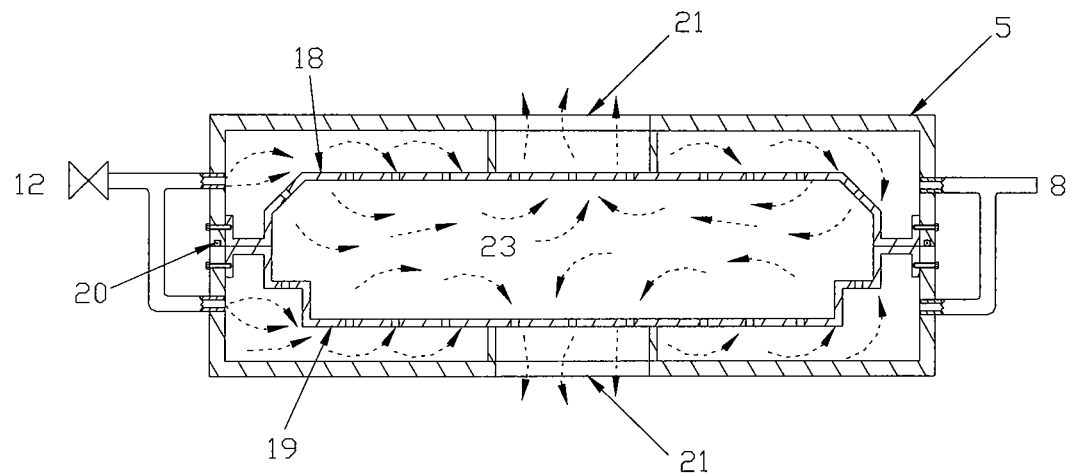
FIG. 4. Cross section view of firing camera and clamp.
Figure 5:
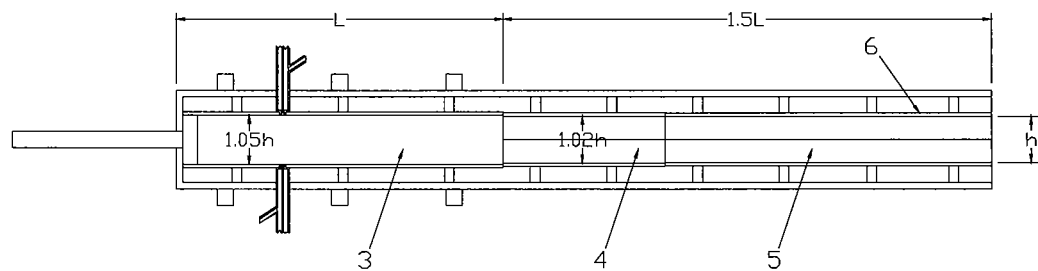
FIG. 5. Length section view of pre-firing cameras, firing and clamp.
Figure 6:
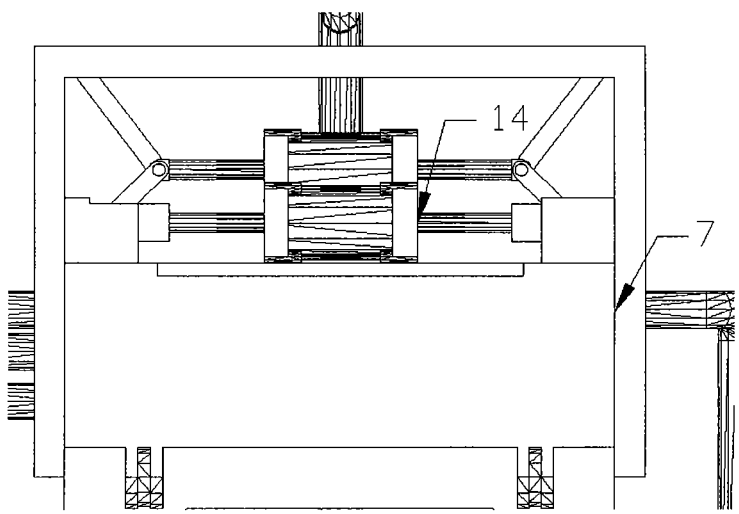
FIG. 6. Detail of front door.
Figure 7:
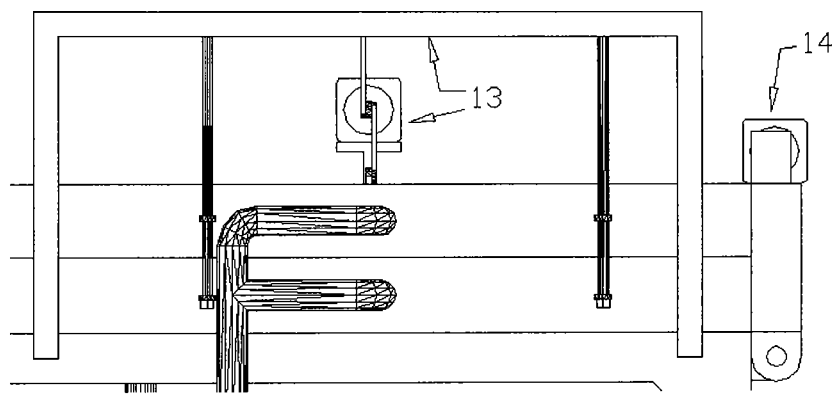
FIG. 7. Detail of close system, firing camera and clamp.
Figure 8:
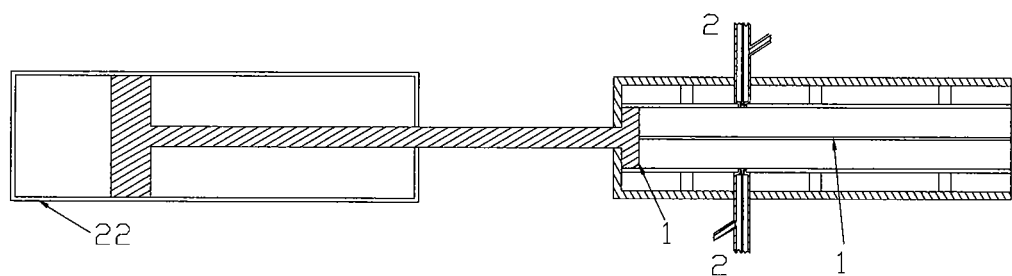
FIG. 8. Detail of pusher separator set.
Figure 9:
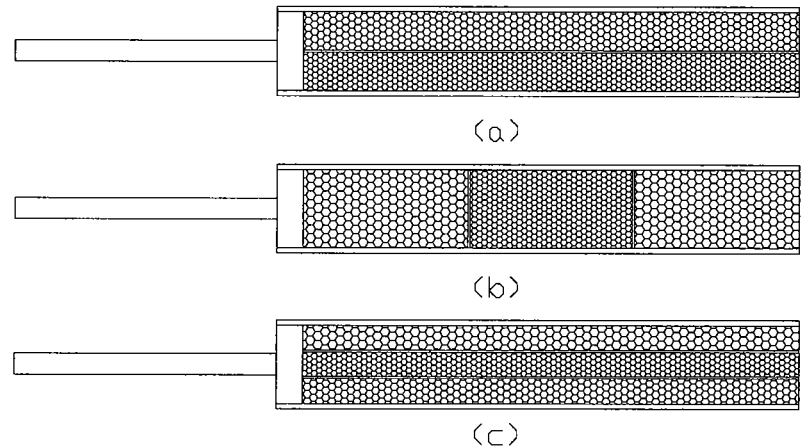
FIG. 9. Schemas of distribution for obtained densities: a) with out divisor, b) with a divisor and c) with n-divisors.

Having described the invention, what is claimed is:

1. A method for producing a solid expanded polystyrene foam element having a uniform cross section, different sections of the solid expanded polystyrene foam element having differing densities, the method comprising the following steps:
    (i) causing pre-expansion of pearls of expandable polystyrene to various densities;
    (ii) resting the pre-expanded pearls in an air environment for a predetermined time period depending on the respective densities of the pre-expanded pearls at atmospheric conditions;
    (iii) feeding the rested pre-expanded pearls of various densities to a partial molding chamber and keeping the pre-expanded pearls separated in different zones based on their respective densities using a pusher/divider;
    (iv) feeding saturated steam at a first pressure for a predetermined time to the partial molding chamber to form a partial molded segment of expanded polystyrene foam;
    (v) transferring the partial molded segment to a final molding chamber using the pusher/divider, the final molding chamber having a separating zone and a clamping zone, the separating zone having a height that is slightly smaller than a height of the partial molding chamber and the clamping zone having a height that is slightly smaller than the height of the separating zone; and
    (vi) clamping the partial molded segment in the separating and clamping zones of the final molding chamber and simultaneously feeding saturated steam at a second pressure for a predetermined time to the final molding chamber to form the solid expanded polystyrene foam element, the second pressure being higher than the first pressure.

2. The method of claim 1, wherein the pre-expanded pearls have densities ranging from 7.5 to 60 kg/m$^3$.

3. The method of claim 1, wherein the time period for resting of the pre-expanded pearls ranges from 3 to 10 hours depending on the respective densities of the pre-expanded pearls at atmospheric conditions.

4. The method of claim 1, wherein the pusher/divider forms a plurality of separate regions in the partial molding chamber, the pre-expanded pearls being fed to different regions of the partial molding chamber depending upon their respective densities.

5. The method of claim 1, wherein the first pressure is 20 kPa and the second pressure is 100 kPa.

6. The method of claim 1, wherein simultaneously with carrying out step (vi), steps (i)-(iv) are repeated, such that consecutive expanded polystyrene foam elements are formed.

7. The method of claim 6, further comprising joining the consecutive expanded polystyrene foam elements to form a continuous piece of expanded polystyrene foam comprising a uniform cross-section and a mixture of densities along the cross-section.

8. The method of claim 1, wherein after transferring the partial molded segment to the final molding chamber, the pusher/divider returns to a retracted state.

9. The method of claim 1, wherein the pusher/divider positions the pre-expanded pearls into the different zones based on their respective densities.

10. The method of claim 1, wherein the height of the clamping zone is h, the height of the separating zone is 1.02 h, and the height of the partial molding chamber is 1.05 h.

11. The method of claim 9, where h equals a height of the solid expanded polystyrene foam element.

* * * * *